Patented Aug. 28, 1934

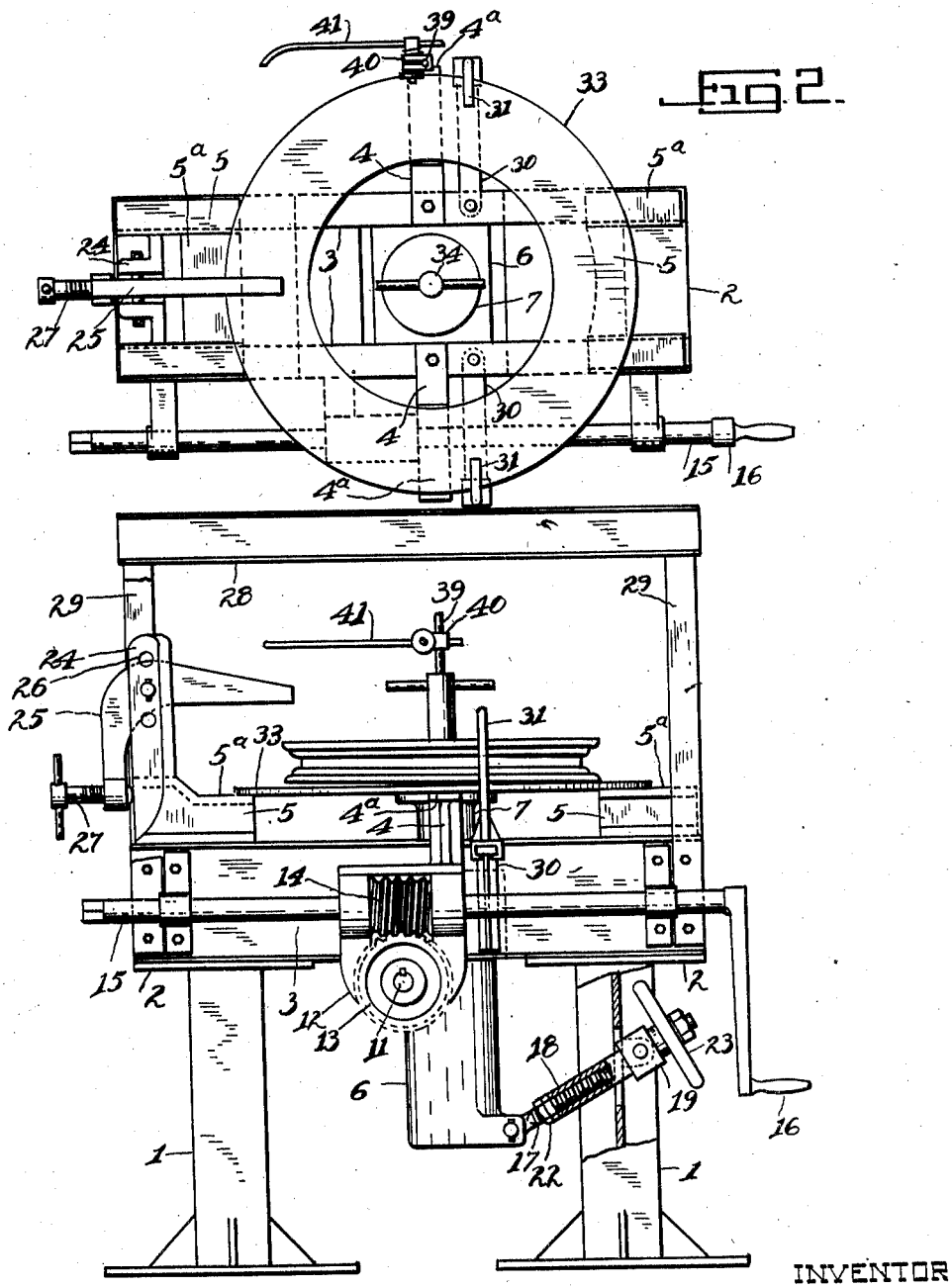

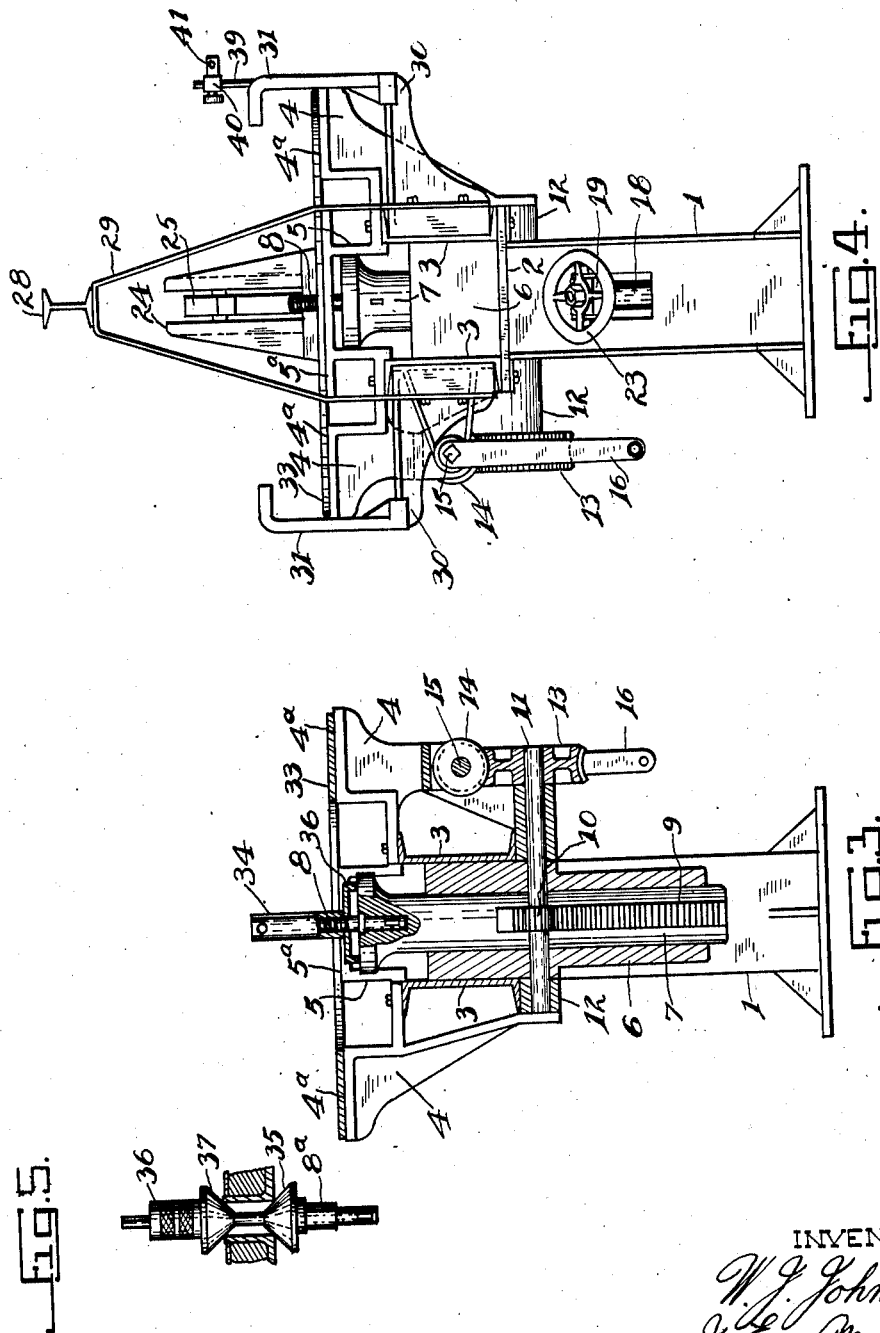

1,971,821

UNITED STATES PATENT OFFICE 1,971,821

WHEEL PRESS

William James Johnston, London, Ontario, Canada, assignor, by direct and mesne assignments, of one-fourth to Norman V. Schooley and one-fourth to Albert Speare Lashbrook, both of London, Ontario, Canada Application December 21, 1933,
Serial No. 703,359½

19 Claims. (Cl. 153—32)

This invention relates to apparatus especially designed for truing vehicle wheels and rims, where rims and spokes or other connections between the rim and hub are of malleable or ductile metal and therefore deformable by pressure, and my object is to devise apparatus for this purpose which will be simple, efficient and adapted for the performance of most of the operations required on a damaged wheel.

I attain my object by means of the constructions which may be briefly described as follows: A suitable base supports substantially horizontal anvil means against which the rim of a wheel may be drawn. A centrally arranged substantially vertical plunger is provided to which a wheel may be attached in the same manner as to a wheel axle. This plunger slides in a sleeve trunnioned on the base so that the plunger may be adjusted to vary the angle of its axis to the plane of the surface of the anvil means. A wheel not true to the axis of the hub may thus be straightened by lowering the plunger to forcibly draw the rim against the anvil means. At one side of the apparatus a yoke is provided in which is pivoted a bell-crank arm, one end extending towards the axis of the plunger while the other engages part of the apparatus through the medium of a screw which may be actuated to move the upper arm to exert local pressure on a bent part of the rim either directly or through the medium of a tool or die. Adjustments for vertical position of this arm are provided to adapt it for rims of different width. To enable a jack to be used above the upper side of a wheel I support a horizontal beam above the apparatus by straps extending down to the bed of the apparatus. This beam serves as an abutment for the jack. At each side of the apparatus I pivot swinging arms, which have upper horizontal parts on which hooked abutment members slide. The swinging members may be moved to various positions to engage different parts of the upper side of the wheel rim. A bed supported on the base provides a rest for a jack to apply pressure to the under side of a rim intermediate the parts engaged by the hooked abutment members aforesaid.

The invention is hereinafter more specifically described and illustrated in the accompanying drawings in which Fig. 1 is a front elevation, partly in section of my improved press;

Fig. 2 a plan view of the same;

Fig. 3 a vertical transverse section of the same, partly in elevation;

Fig. 4 an end elevation looking at the right hand side of Fig. 1; and

Fig. 5 a sectional detail of hub centering means.

In the drawings like numerals of reference indicate corresponding parts in the different figures.

The base of the apparatus is formed by the standards 1, to which is connected the bed plate 2. Secured to the bed plate are the parallel beams 3, which are preferably formed as channels as shown. Intermediate of the ends of the beams 3 the fixed anvil parts 4 are secured to the top of the beams. Slidable on the beams 3 towards their ends are the movable anvil parts 5. The anvil parts have upper surfaces $4^a$ and $5^a$ which are on a level and on which the rim of a wheel may rest.

For some purposes it may be desirable that the anvil means be continuous and I therefore provide the annular plate 33 which rests on the anvil means 5 and on which, in turn, the rim of a wheel may rest.

A plunger guide 6 is supported in the apparatus as hereinafter described and is provided with the plunger 7, which, at its upper end, is provided with a threaded stem 8 adapted to pass through the hub of a wheel. This stem is preferably removable, being set in a recess in the plunger and keyed in place. On this may be threaded a winged sleeve nut 34 adapted to engage a disk 36 which is secured to the hub of the wheel by the usual hub bolts and which holds it securely down against the top of the plunger. As the stem is removable different stems may be employed to suit different conditions and cases, one such being hereinafter described. The plunger has a rack 9 formed thereon which meshes with the pinion 10 which is fast on the shaft 11. This shaft is rotatably mounted in bearings 12 formed on or secured to the frame of the apparatus. A worm wheel 13 is secured to this shaft, which worm wheel meshes with the worm 14, which is secured to the shaft 15 journalled on the frame of the apparatus and provided with square ends to which may be connected a crank 16 whereby the shaft may be operated to rotate the pinion and move the plunger endwise in its guide.

It will be seen that the plunger guide 6 is swingable about the axis of the shaft 11. The angle of the plunger to a horizontal plane may thus readily be varied. To effect this adjustment I provide the threaded bolt 17, which is threaded into the sleeve nut 18. The bolt 17 is shown as pivoted to the lower end of the plunger guide, and the nut 18 is provided with a block 19 in which it is revolubly but non-slidably mounted. This block in turn is trunnioned on the frame of the machine. To the nut is secured a hand wheel 23, by means of which it may be rotated to swing the plunger guide as hereinbefore described. On the threaded bolt are screwed the lock nuts or stop nuts 22, which may be so set that, when the nut is in engagement with them, the axis of the plunger is exactly vertical, or rather normal to the plane of the engaging surfaces of the anvil means.

At one end of the machine intermediate the sides of the apparatus is secured the yoke 24, between the sides of which is pivoted the bell crank arm 25. Several holes 26 are formed in the yoke so that the bell crank lever may be pivoted at different heights above the surfaces of the anvil means. The upper arm of this bell crank extends inwardly towards the centre of the apparatus while the depending arm extends close to the yoke and has a screw 27 threaded therethrough to engage the yoke and form means for causing the upper arm to exert a powerful downward pressure on any part of the rim brought underneath it. Any suitable die may be interposed between the said upper arm and the wheel rim or any suitable support for parts of the wheel rim adjacent the part to be operated on.

A bar 28 is supported above the apparatus and extends longitudinally thereof. Preferably this bar is carried by the straps 29, which are secured to the beams 3 as shown. This bar will serve as an abutment for a jack which is being used to operate on the upper surface of a wheel supported on the anvil means.

It is sometimes found that the hub of a wooden wheel is not true but can be trued by locally applied pressure. To ascertain the condition of the hub I provide a stem 8ª which may be substituted for the regular stem 8 and which is provided with a cone 35 facing upwardly.

A sleeve 36 is provided with a cone 37 and is adapted to slide on the part 38 of the stem 8ª with the apex of the cone 37 facing the apex of the cone 35. A wheel hub may be positioned between the cones and brought to a position with its axis concentric with the axis of the stem. By gauging any high spot on the hub is easily ascertained. Then this spot may be brought to a position above part of the anvil means below the bar 28 and pressure exerted against it by a jack applied against the bar 28 to force it into alinement with the rest of the hub.

For straightening long lateral deformed curvatures of a wheel rim I provide the hook abutments 31 which are connected, preferably slidably, with the upper parts of the swinging brackets 30 which are pivotally connected with the beams 3 when required. It will be seen that the upper part of the bracket 30 is of T form and that the lower end of the hook abutment is formed to engage under the flanges thereof and thus provide a secure slidable engagement.

A wheel having its rim so deformed is placed in the apparatus with the center of curvature uppermost and adjacent the right hand end of the machine.

The hook abutments 31 are then moved to engage the upper side of the rim at the ends of the arc of curvature. (By adjusting the plunger 7 close engagement is assured.) Then a jack placed on the bed plate 2 may be brought to bear against the crown of the deformed arc of the rim and pressure exerted to flatten it out. The right hand anvil part 5 is partly cut away to permit of the positioning of the jack and is also slidable to and from the axis of the plunger as may be necessary.

The importance of the adjustment of the angle of the plunger to the plane of the anvil surfaces is that, if a rim of a damaged wheel is lying in a plane to which the axis of the hub is not normal, it does not suffice to pull down on the hub till the wheel rim lies in contact with the anvil surfaces all round, since a certain amount of spring back will take place after the pressure is released. Therefore the procedure is to adjust the angle of the plunger to increase the degree of divergence of the plane of the wheel rim from parallelism with the anvil surfaces as experience may dictate. Then when the hub is drawn down by actuating the plunger the wheel is sprung sufficiently to take up the actual divergence from its true position relative to the hub and also to allow for the spring back.

To facilitate the detection and measurement of any deformations of the wheel I provide a gauge 41 which is slidable horizontally in a clamp 40 vertically adjustable on the upright stem 39 which is secured to a part of the apparatus preferably one of the beams 3.

The method of use of this gauge will be apparent without detailed description. From the above description it will be seen that I have devised a machine which will enable a large number of operations necessary in truing damaged wheels to be accurately and quickly performed.

It will be understood of course while some operations may be done in the cold that other operations may require parts of the rim to be heated.

So also many operations not specifically referred to may be easily effected by my apparatus.

What I claim as my invention is:

1. In a wheel press the combination of a frame; anvil means supported thereon for engagement with a wheel rim providing a plane surface against which the rim may be trued; hub engaging means; and means for relatively moving the anvil means and hub engaging means substantially parallel to the axis of the hub and rim.

2. A wheel press according to claim 1 provided with means for adjusting the angle of the direction of movement of the anvil means and hub engaging means relative to the rim engaging plane of the anvil means.

3. In a wheel press, the combination of a frame; and upright plunger adapted for engagement with a wheel hub and guided on the frame; anvil means spaced from the plunger for engagement with a wheel rim providing a plane surface against which the rim may be trued; and means for actuating the plunger to draw the wheel rim into contact with the anvil means.

4. A wheel press, according to claim 1 in which the anvil means includes at least one part slidable radially relative to the axis of the plunger.

5. A wheel press, according to claim 1 in which the anvil means includes two diametrically opposite parts each slidable radially relative to the axis of the plunger.

6. A wheel press, according to claim 1 in which the anvil means includes three or more spaced parts and an annular plate removably carried by the said parts.

7. A wheel press according to claim 3 in which means are provided to vary the inclination of the plunger in a vertical plane.

8. In a wheel press, the combination of a frame; an upright plunger guide hinged to swing on a horizontal axis; a plunger slidable in the guide and provided with a rack; a pinion meshing with the rack; a shaft, co-axial with the axis of hinging of the guide and to which said pinion is secured; and means for adjusting the guide about the axis of its hinging.

9. A wheel press, according to claim 3 in which means are provided to vary the inclination of the plunger in a vertical plane comprising a bolt and a nut having pivotal connections respectively with the frame and plunger guide; and means for rotating one of said parts.

10. In a wheel press, the combination of a frame; an upright plunger guide hinged to swing on a horizontal axis; a plunger slidable in the guide and provided with a rack; a pinion meshing with the rack; a shaft, co-axial with the axis of hinging of the guide, and to which said pinion is secured; means for adjusting the guide about the axis of its hinging comprising a bolt and a nut having pivotal connections respectively with the frame and plunger guide; and means for rotating one of said parts.

11. In a wheel press, the combination of a frame; an upright plunger guide hinged to swing on a horizontal axis; a plunger slidable in the guide and provided with a rack; a pinion meshing with the rack; a shaft, co-axial with the axis of hinging of the guide, and to which said pinion is secured; a worm on the shaft meshing with the worm wheel; and means for adjusting the guide about the axis of its hinging.

12. A wheel press according to claim 1 provided adjacent a part of the anvil means with an upwardly extending yoke; and a lever fulcrumed in said yoke intermediate of its ends, one end being engageable with a wheel rim, while power may be applied to the other end.

13. A wheel press according to claim 1 provided adjacent a part of the anvil means with an upwardly extending yoke; and a bell-crank lever member pivoted between its ends having a horizontal arm for engagement with a wheel rim and having a depending arm to which power may be applied.

14. A wheel press according to claim 1 provided adjacent a part of the anvil means with an upwardly extending yoke; a bell-crank lever member pivoted between its ends having a horizontal arm for engagement with a wheel rim and having a depending arm to which power may be applied; and an adjusting screw threaded through the depending arm and engaging part of the frame of the apparatus to provide means for actuating the bell-crank lever.

15. A wheel press according to claim 1 provided with a pair of swinging arms movable about vertical pivots on the frame of the press; and hook-shaped abutment members connected with said arms, whereby by swinging the arms the abutment members may be moved to different positions over the anvil means.

16. A wheel press according to claim 1 provided with a pair of swinging arms movable about vertical pivots on the frame of the apparatus; and hook-shaped abutment members slidable horizontally on said arms, whereby by swinging the arms and sliding the abutment members the latter may be moved to differing positions above the anvil means.

17. In a wheel press the combination of a base; a bed plate secured thereon, a pair of spaced parallel beams secured thereto; a pair of opposite anvil members secured to the middle portions of the beams; a pair of spaced anvil members slidable on the ends of the beams; and means for positioning a wheel and drawing its rim towards the anvil members, the bed plate serving to support a jack.

18. A wheel press, according to claim 1 in which means are provided to vary the inclination of the plunger in a vertical plane comprising a bolt and a nut having pivotal connections respectively with the frame and plunger guide; means for rotating one of said parts; and a stop nut threaded on the bolt to limit the relative movements of the parts in one direction.

19. In a wheel press the combination of a frame; anvil means supported therein for engagement with a wheel rim; a plunger; a stem removably secured in the top of the plunger; means connected with the stem for engagement with a wheel hub; and means for actuating the plunger to draw the wheel rim into contact with the anvil means.

WILLIAM JAMES JOHNSTON.